(12) United States Patent
Pienaar et al.

(10) Patent No.: US 9,122,523 B2
(45) Date of Patent: Sep. 1, 2015

(54) AUTOMATIC PIPELINING FRAMEWORK FOR HETEROGENEOUS PARALLEL COMPUTING SYSTEMS

(71) Applicant: NEC Laboratories America, Inc., Princeton, NJ (US)

(72) Inventors: Jacques Pienaar, Lafayette, IN (US); Srimat T. Chakradhar, Manalapan, NJ (US); Anand Raghunathan, West Lafayette, IN (US)

(73) Assignee: NEC Laboratories America, Inc., Princeton, NJ (US)

( * ) Notice: Subject to any disclaimer, the term of this patent is extended or adjusted under 35 U.S.C. 154(b) by 322 days.

(21) Appl. No.: 13/887,044

(22) Filed: May 3, 2013

(65) Prior Publication Data
US 2013/0298130 A1 Nov. 7, 2013

Related U.S. Application Data

(60) Provisional application No. 61/642,184, filed on May 3, 2012.

(51) Int. Cl.
*G06F 9/46* (2006.01)
*G06F 9/48* (2006.01)
*G06F 9/45* (2006.01)

(52) U.S. Cl.
CPC ............. *G06F 9/4887* (2013.01); *G06F 8/451* (2013.01)

(58) Field of Classification Search
CPC ............................ G06F 9/4881; G06F 9/4843
USPC ........................................................ 718/102
See application file for complete search history.

(56) References Cited

U.S. PATENT DOCUMENTS

| 6,549,930 | B1 * | 4/2003 | Chrysos et al. | 718/104 |
|---|---|---|---|---|
| 2004/0220790 | A1 * | 11/2004 | Cullick et al. | 703/10 |
| 2008/0235690 | A1 * | 9/2008 | Ang et al. | 718/102 |
| 2009/0187915 | A1 * | 7/2009 | Chew et al. | 718/104 |
| 2011/0137617 | A1 * | 6/2011 | Desmet et al. | 703/1 |
| 2012/0159507 | A1 * | 6/2012 | Kwon et al. | 718/104 |
| 2014/0365533 | A1 * | 12/2014 | Debray et al. | 707/803 |

OTHER PUBLICATIONS

Gordon, et al. "Exploiting Coarse-Grained Task, Data, and Pipeline Parallelism in Stream Programs", ASPLOS 2006, Oct. 21-25, 2006, San Jose, California, USA, pp. 151-162.

Monica Lam, "Software Pipelining: An Effective Scheduling Technique for VLIW Machines", SIGPLAN 1988, Jun. 22-24, 1988, Atlanta, Georgia, USA, pp. 318-328.

Ottoni, et al., "Automatic Thread Extraction with Decoupled Software Pipelining", IEEE/ACM 2005, Nov. 12-16, 2005, Barcelona, Spain, 12 pages.

(Continued)

*Primary Examiner* — Emerson Puente
*Assistant Examiner* — Steven Do
(74) *Attorney, Agent, or Firm* — Joseph Kolodka

(57) ABSTRACT

Systems and methods for automatic generation of software pipelines for heterogeneous parallel systems (AHP) include pipelining a program with one or more tasks on a parallel computing platform with one or more processing units and partitioning the program into pipeline stages, wherein each pipeline stage contains one or more tasks. The one or more tasks in the pipeline stages are scheduled onto the one or more processing units, and execution times of the one or more tasks in the pipeline stages are estimated. The above steps are repeated until a specified termination criterion is reached.

19 Claims, 4 Drawing Sheets

(56) References Cited

OTHER PUBLICATIONS

Raman, et al., "Parallel-Stage Decoupled Software Pipelining", CGO 2008, Apr. 5-10, 2008, Boston, Massachusetts, USA, pp. 114-123.
Sanchez, et al., "Dynamic Fine-Grain Scheduling of Pipeline Parallelism", IEEE 2011, Oct. 10-14, 2011, Stanford University, Stanford, CA, USA, pp. 22-32.
Suleman, et al., "Feedback-Directed Pipeline Parallelism", PACT 2010, Sep. 11-15, 2010, Vienna, Austria, pp. 147-156.
Wange, et al., "Fussli: A Portable Framework for Exploiting Hybrid Task, Data and Pipeline Parallelism on Multi-cores", IEEE 2010, Oct. 22-24, 2012, Taiyuan, China, vol. 11, pp. 88-95.

* cited by examiner

US 9,122,523 B2

AUTOMATIC PIPELINING FRAMEWORK FOR HETEROGENEOUS PARALLEL COMPUTING SYSTEMS

RELATED APPLICATION INFORMATION

This application claims priority to provisional application Ser. No. 61/642,184 filed on May 3, 2012, incorporated herein by reference in its entirety.

BACKGROUND

1. Technical Field

The present invention relates to pipelining, and more specifically to automatic generation of software pipelines for heterogeneous parallel systems.

2. Description of the Related Art

Less than a decade into the era of mainstream parallel computing, heterogeneity has emerged as an important characteristic of parallel computing platforms. Heterogeneous parallel computing platforms combines processing units that have different instruction set architectures, different microarchitectures (e.g., multi-core processors and general-purpose graphics processing units (GPGPUs)), or other many-core accelerators. The processing units that constitute a heterogeneous platform are effectively optimized to serve different parts of an application or workload (e.g., latency-sensitive vs. throughput-sensitive, coarse-grained vs. fine-grained parallel sections, etc.). Several efforts have argued for the fundamental benefits of heterogeneity in parallel computing, and demonstrated speedups on heterogeneous platforms for a wide range of application domains.

There have been efforts related to addressing pipelining in the context of homogeneous parallel platforms. Previous research has shown that it is important to consider all these sources of parallelism and exploit the right combination in order to get best performance on a given parallel platform. Application programming interfaces (APIs) for easy specification of pipeline patterns have been provided in parallel programming framework systems such as, for example, Intel's TBB and Microsoft TPL. The computations encapsulated in pipeline stages are issued as tasks to a lower-level runtime, which schedules the tasks onto the cores of a multi-core platform. These frameworks require the programmer to manually identify the individual stages of the pipeline and program them using the provided API. However, identifying the performance-optimal partition of a program region into pipeline stages is far from trivial, and is currently extremely programming and memory-usage intensive. The stages need to be balanced, since the throughput of the pipeline is determined by the slowest stage. Moreover, it is desirable to minimize the memory consumed by the queues that are used to store the data communicated across stages, precluding the creation of arbitrarily fine-grained stages.

In the context of heterogeneous platforms, the problem is significantly more challenging since the execution time of a stage is highly sensitive to how the tasks in that stage are mapped and scheduled on the various processing units of the heterogeneous platform. Heterogeneous parallel platforms, which are composed of processing units that have different instruction set architectures or micro-architectures, are increasingly prevalent. Previous software programming frameworks for heterogeneous systems exploit data parallelism, where the same computation is performed in parallel on different data elements, and task parallelism, where tasks without interdependencies are executed in parallel. Pipeline parallelism is a different form of parallelism that, when exploited, can significantly improve program performance. However, previous programming frameworks for heterogeneous parallel platforms cannot exploit pipeline parallelism, and previous frameworks leave programmers with significant challenges of tuning accelerator code for performance, partitioning and scheduling applications on different processing units of a heterogeneous platform, and managing data transfers between their (often distinct) memory hierarchies.

Therefore, there is a need for a pipelined program that is optimized for a heterogeneous parallel platform starting from an annotated, non-pipelined specification, where the execution of a program may be automatically pipelined at a coarse granularity across processing units (e.g., multi-cores or graphics processing units (GPUs)).

SUMMARY

In accordance with the present principles, a method for pipelining a program with one or more tasks on a parallel computing platform with one or more processing units is provided. The method includes partitioning the program into pipeline stages, wherein each pipeline stage contains one or more tasks, scheduling one or more tasks in the pipeline stages onto the one or more processing units, estimating execution times of the one or more tasks in the pipeline stages, and repeating the above steps until a specified termination criterion is reached.

In accordance with the present principles, a system for pipelining a program with one or more tasks on a parallel computing platform with one or more processing units is provided. The system includes a module configured to partition the program into pipeline stages, wherein each pipeline stage contains one or more tasks, a module configured to schedule one or more tasks in the pipeline stages onto the one or more processing units, a module configured to estimate execution times of the one or more tasks in the pipeline stages, and a module configured to repeat the above steps until a specified termination criterion is reached.

In accordance with the present principles, a method for automatically generating a pipelined program, using a computer processor, on a parallel computing platform is provided. The method includes receiving an un-pipelined program, constructing an intermediate representation with one or more tasks to represent the un-pipelined program, partitioning the un-pipelined program into pipeline stages, scheduling the one or more tasks to execute on the parallel computing platform, and generating a pipelined program for execution on the parallel computing platform.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
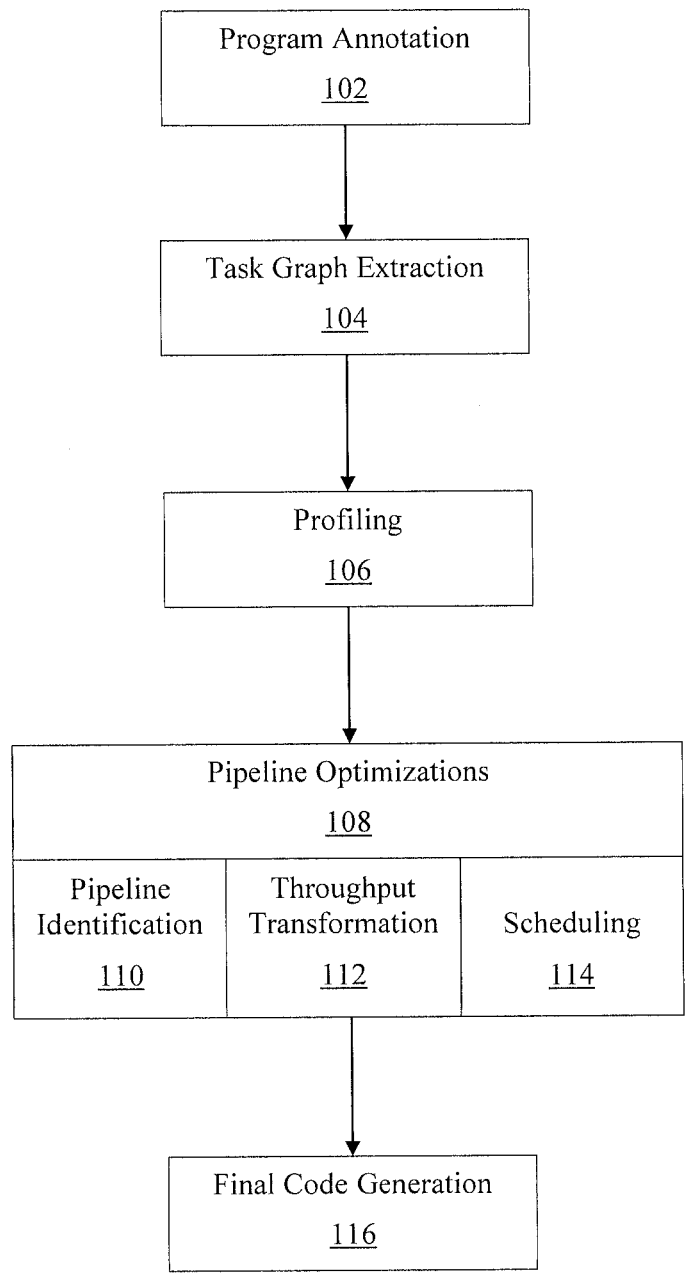
FIG. 1 is a block/flow diagram showing a method for automatic generation of software pipelines for heterogeneous parallel systems in accordance with one embodiment of the present principles.

In accordance with the present principles, systems and methods for automatic generation of software pipelines for heterogeneous parallel systems (AHP) are provided. Pipelined execution has been developed to increase processing unit utilization. AHP may be employed to automatically construct a heterogeneous pipelined version of a sequence of computations. AHP uses profiling to select a pipeline structure and mapping across heterogeneous processing units to achieve a higher throughput than can be achieved on an unpiplined, heterogeneous system.

AHP may be employed for creation of heterogeneous pipelines from non-pipelined program specifications in accordance with the present principles. Given an annotated program where the annotations identify the target program region to be pipelined and decompose it into tasks with explicit dependencies, AHP may extract a task graph from the program region, iteratively partition it into program stages, and schedule the pipelined task graph onto the heterogeneous platform. This iterative process accounts for the interdependency between pipeline stage identification, mapping, and scheduling. The problem of partitioning the task graph into pipeline stages may be formulated using the classical optimization problem of retiming. The present principles improve the performance (throughput) of software that executes on heterogeneous parallel computing systems by exploiting pipeline parallelism by employing AHP. In addition, AHP reduces the programming complexity (programmer effort) needed to create pipelined software implementations on heterogeneous parallel platforms.

Stream programming may embody the concept of pipelining, since the programs are specified as kernels that operate on streams of data. Each kernel can be realized as a separate stage in a software pipeline. Compiler and runtime frameworks have been developed for stream programming that automatically map the kernels onto (homogeneous) processing elements in a multi-core platform. However, the problem of delineating the program into pipeline stages must be manually performed by the programmer. For heterogeneous platforms, this problem is significantly more complex and interdependent on the mapping and scheduling of tasks onto the processing units. A key challenge (that is different from pipelining for homogeneous platforms) is the interdependency between the partitioning of the program into pipeline stages, and the mapping and scheduling of the stages onto the processing units in the platform.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a method for automatic generation of software pipelines for heterogeneous parallel systems (AHP) 100 is illustratively shown in one embodiment according to the present principles.

In one embodiment according to the present principles, the AHP system receives an annotated program (e.g., C++) and may generate an optimized heterogeneous pipelined executable. The AHP method 100 may begin by analyzing source code with additional AHP compiler directives. It may then employ these directives to extract sections of code that a programmer has indicated may execute in a pipelined manner. It may then profile the tasks on multiple processing units (PUs), optimize a pipeline structure for a given system, and generate an optimized pipeline structure to be employed during production runs.

In one embodiment according to the present principles, program annotation 102 is performed by AHP 100. AHP 100 may provide a set of compiler directives (see "Grammar 1" and "Pseudocode 1" below for illustrative examples), which may allow a programmer to incrementally employ AHP.

Grammar 1:

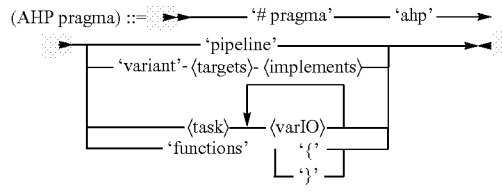

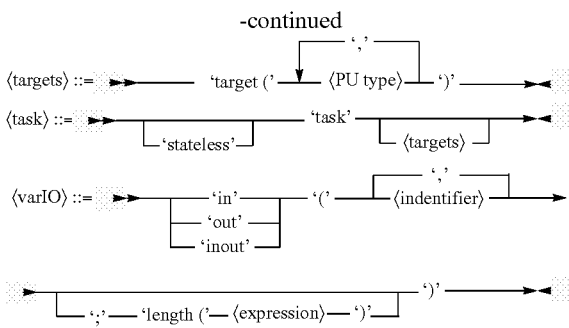

Pseudocode 1:

```
#include <iostream>
#pragma ahp functions    {
int scale (double sum, double step)
{     return step * sum;     }
#pragma ahp functions }
// note: just to illustrate variant mechanism, not required.
#pragma ahp variant target (mic) implements (scale)
int scalevariant ( int onmic, double sum, double step)
{
    int local_pi ;
    #pragma offload target (mic: onmic) in (sum)
          out (local_pi)
    local_pi = step * sum ;
    return local_pi ;
}
int main ( )
{
    int num_steps – 0 ;
    cons tint n = 200;
    float pi, sum ;
    #pragma ahp pipeline
    while ((num_steps += 5) < n) {
       //compute πfor num_steps iterations
       #pragma ahp task in (num_steps) out (sum, step)
       {
       step = 1.0 / (double) num_steps ;
       sum = 0.0f ;
       #pragma omp parallel for reduction (+: sum)
       for (int i=0; i < num_steps; i++) {
           float x = (i+0.5) * step ;
           sum = sum +4.0/(1.0+x*x) ;
       }
       #pragma ahp task in (sum, step) out (pi)
       pi = scale (sum, step) ;
       #pragma shp task target (CPU) in (num_steps, pi)
       print f (" Steps: %d, pi : %f/n" , num_steps, pi) ;
       }
   }
```

In one embodiment according to the present principles, the source code (e.g., C++) that is input into AHP may consist of a plurality of different types of code sections, of which five examples are illustratively provided below:

(1) Regular Code: Regular code may be defined as code (e.g., C++ code) that is not marked by AHP specific compiler directives.

(2) Pipeline sections: Compiler directions may be employed to indicate that a section of the code can be executed in a pipelined manner and should be further analyzed. Each pipeline section may consist of a single while-loop with multiple tasks. The termination condition of this loop may indicate that all data has been processed and can use any arbitrary function (e.g., C++ function).

(3) Tasks: Each task may consist of a single code block as well as an input/output specification (read [in], write [out], and read and write [inout]) of the data accessed within the task. Tasks may be constrained to execute on specific PU types. For example, a task requiring access to a hard drive could be constrained to execute on the host CPU, and the programmer may indicate that a task is stateless (i.e., a pure function).

(4) PU-specific function variants: Function variants may serve multiple purposes. For example, they may allow specifying functions or alternative algorithms to optimally utilize a specific PU type, or they may allow utilizing PU-types (new or existing) for which code cannot be easily generated from another code specification. AHP may build upon compiler technology that generates code for a memory interface controller (MIC) while using variants for Graphics Processing Unit/Compute Unified Device Architecture (GPU/CUDA) code. AHP may also leverage approaches such as Hybrid Multicore Parallel Programming (HMPP), OpenACC, OpenMPC, or OpenCL to generate a larger range of PU-specific versions.

(5) Delimited functions: These functions may be delimited using start and end AHP pragmas to indicate that these functions may be analyzed and optimized for multiple PUs. Functions called from within the pipeline section may be within such a section or be a function variant.

While the above types of code sections and programming approaches are illustratively shown according to the present principles, it is contemplated that other sorts of code sections and programming approaches may also be employed according to the present principles.

In one embodiment according to the present principles AHP may extract, using a processor, a task-graph for each pipeline section from the annotated C++ code in block 104. During the program analysis phase, each pipeline segment and tasks of each pipeline may be extracted. The task graph extracted may be referred to as a Parallel Operator-Directed Acyclic Graph (PO-DAG) as it may be a Directed Acyclic Graph (DAG) (which may be a multigraph as parallel edges are allowed), and the tasks may exploit data- and instruction-level parallelism. A PO-DAG may be represented by the tuple of vertices and arcs (V;A). The PO-DAG for each pipeline may be constructed using the DAG-consistency model. This may enforce the data-flow semantics of the original program execution order whilst allowing greater scheduling flexibility and out-of-order execution. The vertices of the PO-DAG are annotated with the task's code and the arcs of each node is annotated with the name of the variable (one per arc) and type of data being communicated between tasks.

In one embodiment according to the present principles, Profiling may be performed in block 106. In one embodiment, after the PO-DAG has been extracted for each pipeline section during program analysis, AHP may be employed to determine the execution time of each task on every possible PU attached in the system. As with traditional profile-based approaches, the profiling input may be representative. In AHP's case, this means that the relative execution times of tasks on PUs using the profiling input may be reflective of the relative execution times of the same tasks on the PUs during productive runs. Each task may be executed multiple times during the profiling run, and the framework may execute multiple profiling runs. The resultant execution times may be employed to compute the average execution times, which may thereafter be employed as the expected runtime of the task on a PU. The profiling and optimization (discussed below) may occur without consideration for interaction between different pipelines.

In one embodiment according to the present principles, during profiling in block 106, the PO-DAG, (V, A), may be extended, for example, to the profiled PO-DAG, (V,E,e,c), where e:V→$\Re^P$ denotes the expected execution time on each of the P PUs, and c: A→$\Re^{P\times P}$ denotes the communication time required to move the data associated with the arc, from one PU to another. According to the present principles, it is possible to move data from any PU to another, even if it is via the host CPU. The profiling runs may be used to compute e while a communication model, derived, for example, by a straightforward benchmark consisting of $O(P^2)$ data movements, may be employed in addition to the programmer annotations to derive c.

In one embodiment according to the present principles, pipeline optimization may be performed in block 108. The pipeline optimization process in block 108 may consist of iteratively pipelining and scheduling to identify an optimum pipeline structure. A high-level description of the method is illustratively shown according to one embodiment in Pseudocode 2 (below), starting with the profiled PO-DAG and a specified number of pipeline stages.

---
Pseudocode 2:
---
```
input : Profiled PO-DAG G = (V,A,e,c)and number of
    pipeline stages S
output : Optimized pipeline partitioning P̄
create dummy source and sink node;
// Create pipelining DAG, G' = (V,A,d,w)
foreach v ∈ V do d(v) ← mine(v);
foreach a ∈ A do
    if a ∈outgoing(source) then w(a) ← S ;
    else w(a) ← 0
end
// Iteratively pipeline and schedule
P ← (V,θ,...,θ);
while P unseen do
    P ← stageIdentification(G', P );
    G'' ← throughputMapping(G, P );
    (G',t) ← schedule(G'', P );
    if best execution time seen then P̄ ← P ;
end
return P̄
```
---

In one embodiment, pipeline structure creation and scheduling may be mutually interdependent processes (i.e., the pipeline structure creation may employ the execution times and communication costs for which the schedule/mapping is required, and the scheduler may analyze the pipelined structure to know which tasks may be concurrently executed). However, AHP may break this cyclic dependency by alternatively scheduling and pipelining in an iterative manner according to the present principles.

The pipeline optimization method may employ a plurality of other methods according to the present principles. For example, pipeline identification 110, throughput transformation 112 and scheduling 114, which will be discussed in further detail below. In one embodiment, for pipelining in block 110, an approach from digital logic synthesis called retiming may be employed according to the present principles. Retiming is a technique for moving registers in a digital circuit to improve performance, area, and/or power while preserving functional behavior at its outputs. Retiming may be employed using AHP 100 by considering the registers to be queues and the circuit elements to be tasks. In one embodiment, moving the registers effectively balances the pipeline stages.

In one embodiment, the queue count, w, and propagation delay, d, may be defined, in the iteration in pipeline optimizations algorithm, for each vertex or arcs. The queue count of an arc may correspond to the number of queues on that arc, while the propagation delay may correspond to the best execution time of a task. The definitions of w and d may be extended to paths as follows:

$$\text{for any path } p = v_o \xrightarrow{e_0} v_1 \xrightarrow{e_1} \cdots \xrightarrow{e_{k-1}} v_k \quad (1)$$

$$w(p) \equiv \sum_{i=0}^{k-1} w(e_i) \text{ and } d(p) \equiv \sum_{i=0}^{k} d(v_i)$$

This may lead to two central quantities in solving the retiming problem, for example, $$W(u, v) := \min\{w(p): u \xrightarrow{p} v\}, \quad (2)$$

$$D(u, v) := \min\{d(p): u \xrightarrow{p} v \wedge w(p) = W(u, v)\}. \quad (3)$$

In one embodiment, u,v∈V,W(u,v) may correspond to a minimum number of queues on any path between u and v in the graph, and D(u,v) may correspond to the maximum total propagation delay (in the terminology of retiming) on any path between u and v that has the minimum number of queues (W(u,v)). These two values may be computed first during the pipelining method, illustratively shown in Pseudocode 3 (below). Thereafter, a search (e.g., binary search) over the range of D may be performed to find the retiming vector, which may be employed to update the position of the queues, after which the stages may be extracted from the position of the queues.

---
Pseudocode 3:
---
```
input : G' = (V, A, d, w)
output : Partition P
for each u ∈ outgoing(u) do
    for each a ∈ outgoing(u) do
        weight a with (w(a), −d(u));
    end
end
compute all pair shortest-path in G_{wd};
for each u, v, ∈ V do
    (x, y) ← shortest path between u and v;
    W(u, v) ← x;
    D(u, v) ← d(v) − y;
end
RD ← sort elements in the range of D;
low ← 1;
high ← size (RD);
// Find minimum achievable period
while low≤high do
    mid ← low + ⌊(high-low)/2⌋
    c ← RD[mid];
    if ∃ R:V →ℜ, r:V → Z
        s.t. r(v) − R(v) ≤ d(v/c)           ∀v ∈ V
            R(v) − r(v) ≤ 1                  ∀v ∈ V
            r(u) − r(v) ≤ w(a)              ∀a = (u, v) ∈ A R(u) − R(v) ≤ w(a) − d(v)/c    ∀a = (u,v) ∈ A then
        |high ← mid − 1
        |r̄ ← r ;
    end
```

-continued

Pseudocode 3:

```
        else low ← mid + 1
            r̄ ← r
        end
        // Adjust queue count
        foreach a = (u, v) ∈ V do w(a) ← w(a) + r̄(v) – r̄(u);
    𝒫 ← findPartiion(G');
    return 𝒫
```

In one embodiment, to deduce the task to stage mapping during pipelining in block 110, the function findPartion( ) above, AHP may perform a breadth-first traversal of the PO-DAG and may consider a stage as the section of the PO-DAG between successive queues (as determined, for example, by r(•)). If all the tasks in a stage are stateless, then the stage is stateless and may be executed concurrently with itself. Such a stage is referred to as a parallel stage. If all the tasks in a stage are not stateless, a stage may be constrained such that no two instances of it are in flight concurrently. The output of this process may be a task to stage mapping represented as an S-tuple of sets of tasks. This mapping may be referred to as a partitioning, and it may be denoted by P. While the above-mentioned pipeline identification is illustratively shown, it is contemplated that other sorts of pipeline identification may be employed in accordance with the present principles.

In one embodiment, throughput transformation is performed in block 112, which may transform the PO-DAG to take into account the pipeline structure before scheduling and mapping tasks to PUs. A goal of heterogeneous task schedulers in unpipelined applications is to optimize for latency, but AHP may advantageously transform the graph such that the latency optimal solution of the transformed graph corresponds to the throughput optimized solution of the original graph. This transformation, illustratively shown according to one embodiment in Pseudocode 4 (below), may consist of creating a profiled PO-DAG wherein the subgraphs induced by the partitioning may be independent and can be executed in parallel.

Pseudocode 4:

```
input   :Profiled PO-DAG G = (V_G, A_G, e_G, c_G) and
         partitioning 𝒫
output  : Profiling PO-DAG H = (V_H, A_H, e_H, c_H)
H ← ({source₁ sink}, θ, e_H, c_H)
foreach p ∈ 𝒫 do
    H ← H ∪ G_[p];
    foreach v ∈ G_[p] do
        e_H(v) ← e_G(v)
        foreach a ∈ {A_G : v ∈ a} do
            if a ∉ G_[p] then
                if a ∈ incoming_G(v) then
                    a' ← (source, v);
                else a' ← (v, sink);
                A_H ← A_H ∪ a';
                c_H(a') ← c_G(a);
            end
        end
    end
end
return H ;
```

In one embodiment, scheduling is performed in block 114 according to the present principles. As discussed above, scheduling and pipelining may have a strong interdependence. In AHP a list-based scheduler that schedules tasks to PUs based on the suitability of a task to the PU, locality of data, and when a PU will be available may be employed according to the present principles. However, any scheduler may be employed for this step, as long as it is deterministic as the search approach employs determinism in this embodiment. The throughput transformed graph may be scheduled to produce a task to PU mapping as well as revising the so-called delay time (i.e., the values of d, in the retiming graph). The delay may be adjusted to reflect the total time from when the task was ready to execute until it completed (i.e., the time waiting for data to arrive, the selected PU to become available, as well as the execution time on the mapped PU).

When employing an iterative method according to the present principles, there may be a question of convergence. Convergence may be enforced by detecting a reoccurring partitioning, and if a partition occurs multiple times and the methods used are deterministic, then either the procedure may have converged or a cycle may have occurred. In either case, the method may simply return the most optimal partition yet discovered.

In one embodiment, the iterative approach employed by AHP may employ propagation delay (d), task to PU, and task to stage mapping changes as AHP iteratively pipelines and schedules in block 114. A first iteration may produce a pipeline structure and schedule of a first pipeline structure, and the next that of a second pipeline structure, to which the method converges. The scheduling produced may be static, even for tasks in parallel stages of which multiple instances may be in flight simultaneously. Rather than doing this static scheduling, the loop may also be unrolled, and a cyclic schedule may be created according to the present principles.

Search complexity may also be accounted for using scheduling in block 114. For example, assuming $|V|$ tasks, S pipeline stages and P PUs, then there may exist $O(S^{|V|})$ possible task to stage mappings, and $O(P|V|)$ possible schedules. When combined, there may be $O(S^{|V|}P^{|V|})$ possible pipeline realizations to consider according to one embodiment. Employing retiming and scheduling as a search heuristic may allow for efficient navigation of this search space. Retiming may have (assuming the densest possible graph structure), $O|V|^3 lg|V|$ running time, and the list-based scheduler employed may be $O|V|^3$. Therefore the running time of this embodiment of stage identification may be $O|V|^3 lg|V|$ per iteration. In the homogeneous case, one iteration may be employed, but it is not easily bounded.

In one embodiment according to the present principles, the final process in AHP is to generate the production code in block 116. This final process in AHP may generate the production code using the pipeline structure and mapping determined. Additional analysis may be employed by the final code generation method, which may consist of determining the data communication and versioning requirements of each pipeline. AHP may map the generated pipeline structure onto the TBB pipeline construct. AHP also may determine which data should be passed between and through stages, as the TBB pipeline may be a linear pipeline. Furthermore, different versions of a data structure may be in flight at the same time and the generated code may manage this generated code accurately and efficiently.

In one embodiment, data communication needs may be addressed in block 116. The final code generation in block 116 may determine which data may be moved from one stage to another. For example, to determine which data should be communicated from stage i to stage (i+1) following computation may be performed using the information in the PO-DAG:

$$\left\{ \bigcup_{j=1}^{i} produced_j \right\} \cap \left\{ \bigcup_{j=i+1}^{S} consumed_j \right\}.$$

In one embodiment, all data produced in stages 1 to i that is consumed in stages i+1 to S, may be communicated from stage i to stage (i+1). The output of the above may be employed to generate structure types (struct) and the corresponding struct instances that are populated, manipulated, and passed between pipeline stages. The communication pattern may be fixed at this point as the mapping of task to PU may have been determined. Hence data transfer calls may be inserted to keep the data coherent.

There exists a plurality of approaches for keeping the memory coherent between the PU's. For example, there exist two primary approaches to keeping the memory coherent between the PUs: distributed shared memory (e.g., Intel MYO and GMAC), and message passing-like models (e.g., MPI, CUDAs explicit memory movement calls, and Intel MICs offload model). In one embodiment according to the present principles, explicit data transfer calls are inserted when employing AHP. Data structures that employ deep copies (e.g., trees) may be serialized and de-serialized using an approach similar to that of the Boost Serialization library. Any of these approaches may be used (either alone or together) as long as both mechanisms do not attempt to simultaneously keep the same structure coherent. While the above approaches are illustratively provided, it is contemplated that other approaches may also be employed according to the present principles.

In one embodiment, data versioning may be employed in block 116 during final code generation. The original unpipelined program may function correctly without the data versioning, but since the pipelined version may contain multiple versions of the same data structure in flight, data versioning may be employed to account for the multiple versions. For example, in one embodiment, Threading Building Blocks (TBB) may provide a pipeline construct with which one can realize a pipeline, but the data management of the pipeline is left to the programmer.

By employing the present principles, AHP may determine the data versioning needs and may insert the appropriate calls to the supporting functions. For example, AHP may insert code to duplicate (i.e., allocate and copy) as well as merge data structures (i.e., recombine result as well as free unneeded copies). As the data structure may be copied only once (if desired) per pipeline iteration, the number of copies concurrently in flight may be bounded by the number of pipeline instances in flight (not a tight bound), and AHP may avoid unnecessary allocation and deallocations by employing a circular buffer. This circular buffer may also keep track of the last instance of a variable that flowed through the pipeline, allowing the correct handling of live-out variables while reclaiming memory once the last iteration is completed. While the above method for data versioning is illustratively provided, it is contemplated that other sorts of data versioning methods may be employed in accordance with the present principles.

Once the data communication and versioning needs have been determined, the final optimized output may be generated in block 116 using this, the results of the previous stages, the pipeline structure, and the mapping.

Figure 2:
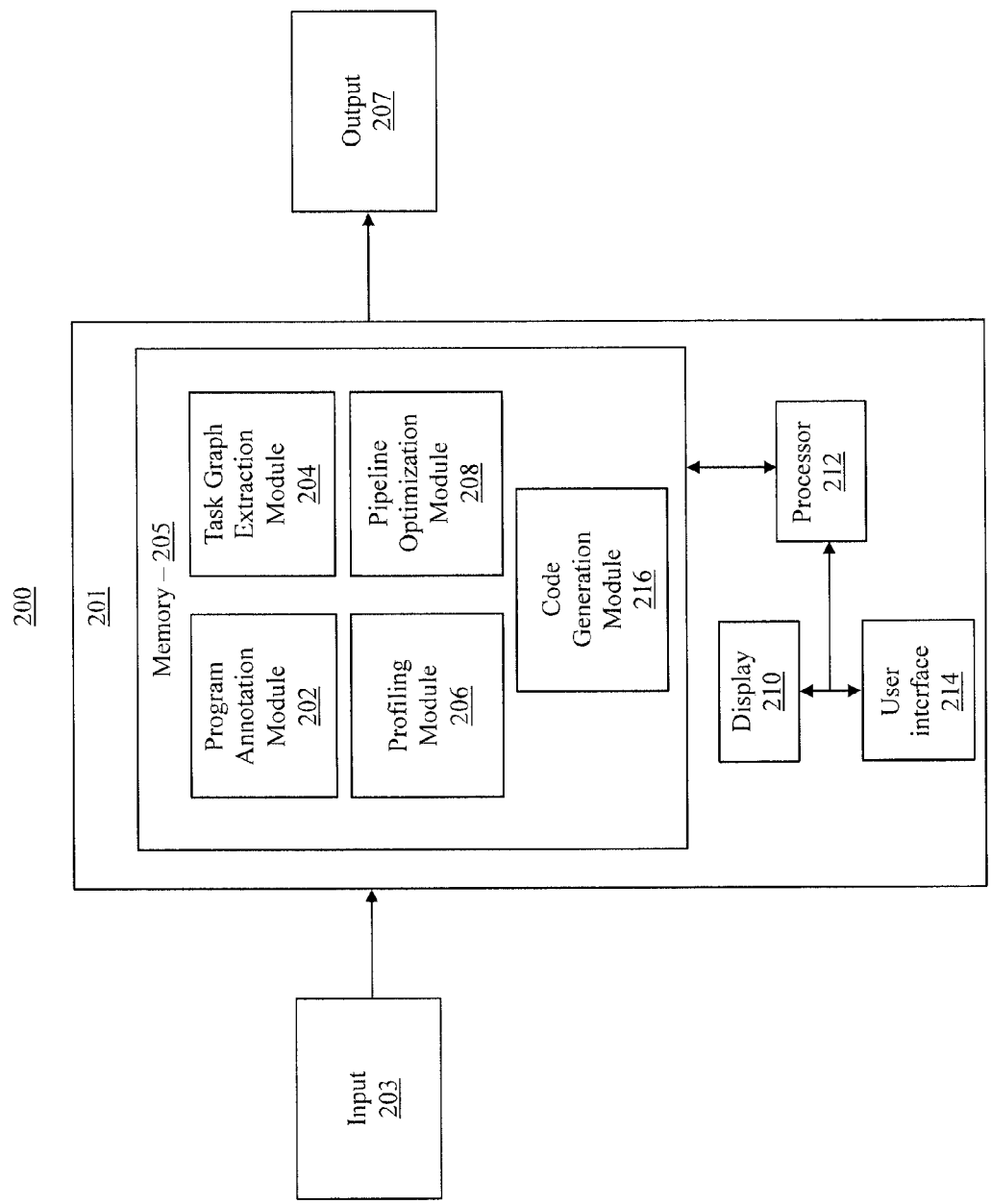
FIG. 2 is a block/flow diagram showing a system for automatic generation of software pipelines for heterogeneous parallel systems in accordance with one embodiment according to the present principles.

Referring now to FIG. 2, a system for automatic generation of software pipelines for heterogeneous parallel systems (AHP) 200 is illustratively depicted in accordance with one embodiment of the present principles. The AHP system 200 may include a workstation or system 201. The system 201 preferably includes one or more processors 212 and memory 205 for storing applications, modules, and other data.

System 201 may include one or more displays 210 for viewing. The displays 210 may permit a user to interact with the system 201 and its components and functions. This may be further facilitated by a user interface 214, which may include a mouse, joystick, or any other peripheral or control to permit user interaction with the system 201 and/or its devices. It should be understood that the components and functions of the system 201 may be integrated into one or more systems or workstations.

In one embodiment, the system 201 may receive input 203, which may include computer code (e.g., C++) or other data. The system 201 may also include a plurality of modules, which may have one or more program annotation modules 202, task graph extraction modules 204, profiling modules 206, pipeline optimization modules 208, and/or code generation modules 216. In one embodiment, after the final code is generated in the code generation module 216, the final optimized output 207 may be generated and output for use during production runs. While the above-mentioned system and modules are illustratively provided, it is contemplated that other sorts of systems and modules may also be employed according to the present principles.

Figure 3A:
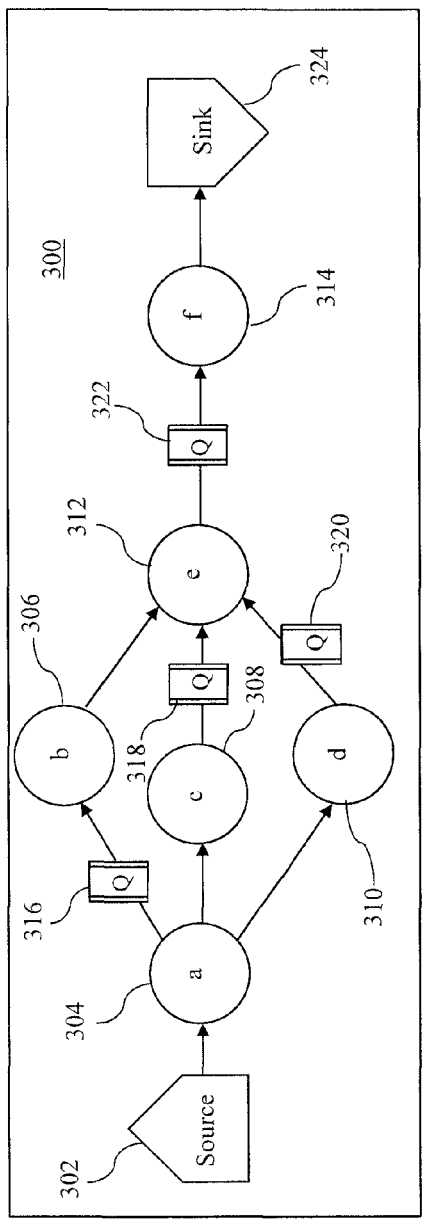
FIG. 3A is a block/flow diagram showing a method for performing a breadth-first search (BFS) in accordance with one embodiment of the present principles.

Referring now to FIG. 3A, a method of determining pipeline stages by employing a breath-first search (BFS) 300 is illustratively depicted in accordance with one embodiment of the present principles. In one embodiment, data (i.e., C++ code) may be input into the source 302 (i.e., start), and a plurality of tasks 304, 306, 308, 310, 312, and 314 may be extracted from the source 302 to obtain task to stage mappings. Boundaries (Q) 316, 318, 320, and 322 between pipeline stages may determine pipeline partitions and pipeline stages. In an exemplary embodiment, by performing BFS 300 from the source 302, pipeline stages may be identified as P=({a,c,d}, {b,e}, {f}), which corresponds in FIG. 3A with three (3) sets of pipeline stages—{304, 308, 310}, {306, 312}, and {314}. The pipeline stages may execute asynchronously, and different stages may concurrently execute different tasks than other pipeline stages. The result may be output to the sink 324, which may represent the completion of the BFS. While the above-mentioned method and arrangement of pipeline stages are illustratively provided, it is contemplated that other sorts of methods and arrangements of pipeline stages may also be employed according to the present principles.

Figure 3B:
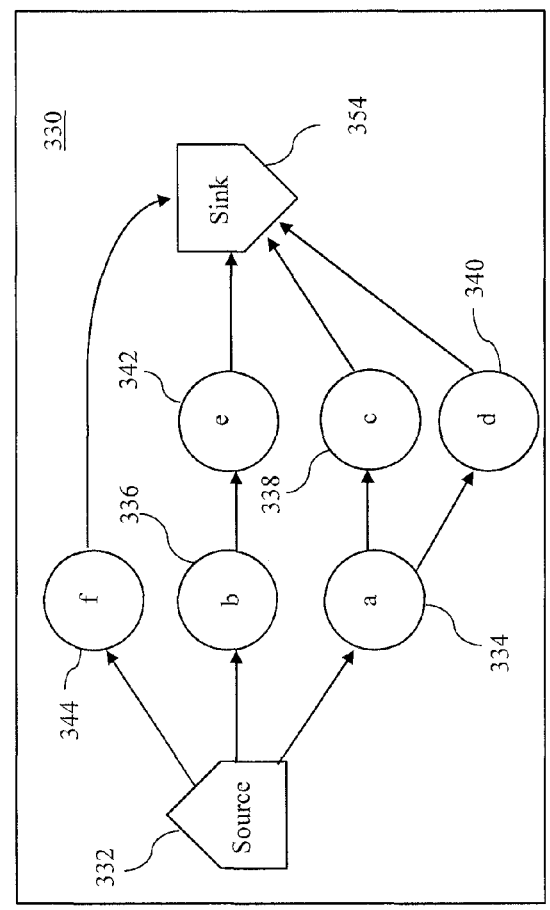
FIG. 3B is a block/flow diagram showing a method for performing throughput transformation in accordance with one embodiment of the present principles.
Figure 4:
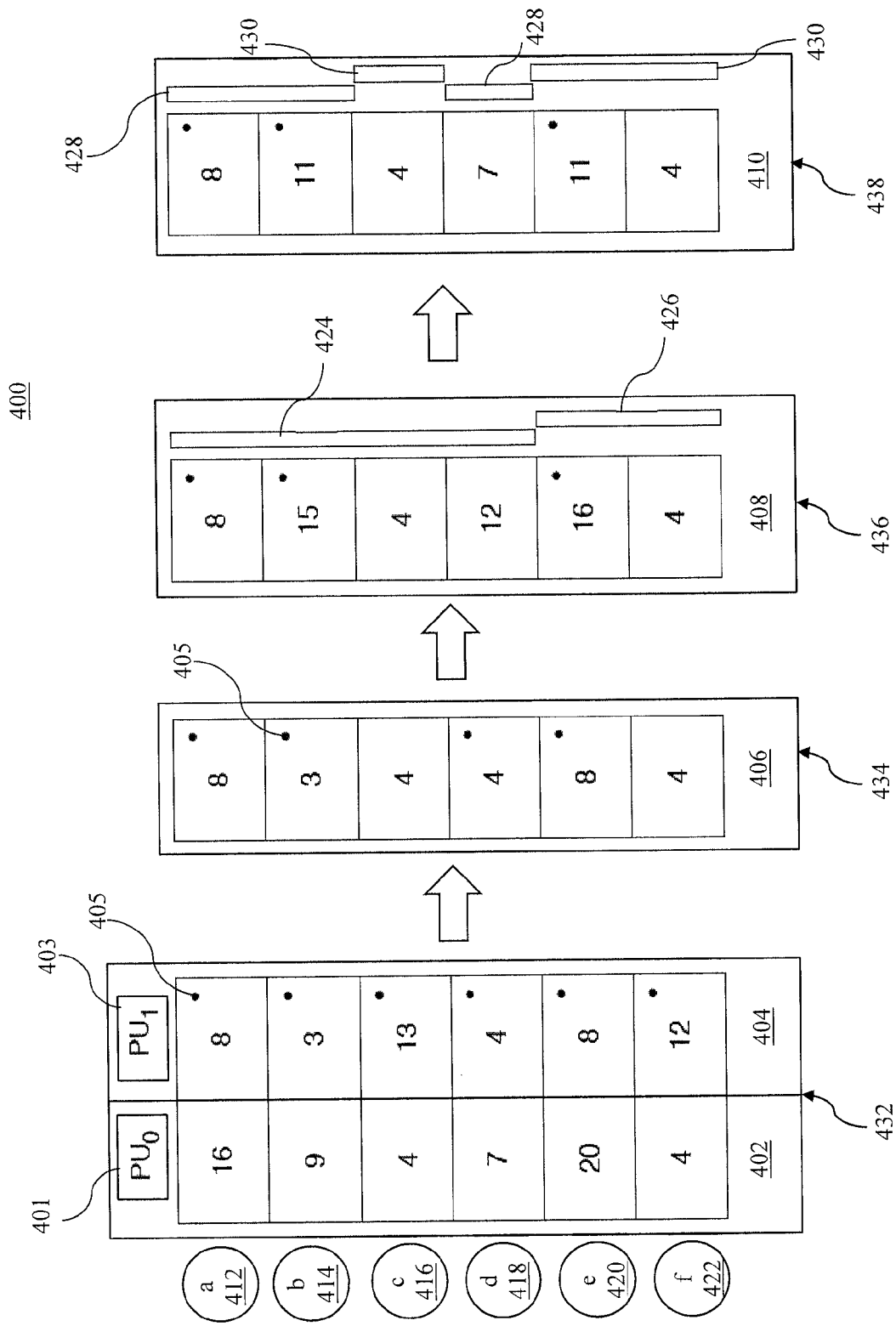
FIG. 4 is a block/flow diagram showing a method for iterative stage identification and scheduling in accordance with one embodiment of the present principles.

Referring now to FIG. 3B, a throughput transformation graph 330 which may represent a pre-processing scheduling step is illustratively depicted in accordance with one embodiment of the present principles. In one embodiment, data (i.e., C++ code) may be input into the source 332 (i.e., start), and a plurality of tasks 334, 336, 338, 340, 342, and 344 may be extracted from the source 332, and from the pipeline stages identified in FIG. 3A, a throughput graph 330 may be created by considering the subgraphs induced by the sets of the partition (i.e., pipeline stage) to be independent. In one embodiment, the pipeline stages may advantageously pipeline in parallel, and the throughput transformation graph 330 may represent scheduled pipelines with an equivalent unpipelined graph. The result may be output to the sink 354, which may represent the completion of the transformation. While the above-mentioned transformation method and arrangement of pipeline stages are illustratively provided, it is contemplated that other sorts of transformation methods and arrangements of pipeline stages may also be employed according to the present principles.

Referring now to FIG. 7, an iterative approach to pipelining and scheduling 400 is illustratively depicted according to one embodiment of the present principles. In one embodiment, the propagation delay times (d) 402 and 404 for Processing Unit 0 ($PU_0$) 401 and Processing Unit 1 ($PU_1$) 403, respectively, are depicted for a plurality of exemplary tasks 412, 414, 416, 418, 420, and 422. In one embodiment, the small black circle 405 depicted within propagation delay time blocks (e.g., 402) representing particular tasks (e.g., 412) denotes that processing is being performed by $PU_1$ in one embodiment. The lack of a small black circle 405 denotes that processing is being performed by $PU_0$ in one embodiment. In one embodiment, a profile 432 of propagation delay times 402, 404 may be employed in accordance with the present principles. An initial, unpipelined, input 434 including propagation delay times 406 is illustratively shown according to the present principles.

In one embodiment, a first iteration 436 including propagation delay times 408 may produce a pipeline structure including Stage One 424 and Stage Two 426. A second iteration 438 including propagation delay times 410 may produce another pipeline structure and schedule including Stage Three 428 and Stage Four 430, after which the method may converge. In one embodiment, a schedule produced by AHP may be static, even for tasks in parallel stages for which multiple instances may be in flight simultaneously. In another embodiment, rather than employing static scheduling for parallel stages, a loop may be unrolled, and a cyclic schedule may be created according to the present principles. While the above-mentioned iterative method for pipelining and scheduling is illustratively provided, it is contemplated that other sorts of iterative methods for pipelining and scheduling may also be employed according to the present principles.

Having described preferred embodiments of a system and method for automatic generation of software pipelines for heterogeneous parallel systems (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for pipelining a program with one or more tasks on a parallel computing platform with one or more processing units, comprising:
    partitioning the program into pipeline stages, wherein each pipeline stage contains one or more tasks;
    determining data to be communicated from stage i to stage (i+1) using:

$$\left\{\bigcup_{j=1}^{i} produced_j\right\} \cap \left\{\bigcup_{j=i+1}^{s} consumed_j\right\};$$

scheduling one or more tasks in the pipeline stages onto the one or more processing units;
    estimating execution times of the one or more tasks in the pipeline stages; and
    repeating the above steps until a specified termination criterion is reached.

2. The method as recited in claim 1, wherein the program is specified using annotations in the source code, with the annotations being employed to identify one or more tasks in the program.

3. The method as recited in claim 1, wherein the one or more tasks in the program have dependencies from other tasks.

4. The method as recited in claim 1, further comprising executing a pipelined on the parallel computing platform to estimate the execution times of the one or more tasks in the pipeline stages, wherein at least one task in the program is profiled on at least one of the processing units, with a result of profiling the at least one task in the program being employed to estimate the execution times of the one or more tasks in the pipeline stages.

5. The method as recited in claim 1, wherein the specified termination criteria is reached when partitioning the program into pipeline stages results in a partition that is identical to a previously derived partition.

6. The method as recited in claim 1, wherein the specified termination criteria is reached when the above steps have been executed a specified number of times.

7. The method as recited in claim 1, wherein each of the one or more tasks in the program employs parallel computations which are exploited during task execution on the one or more processing units.

8. The method as recited in claim 1, wherein the partitioning the program into pipeline stages is performed by representing the program as a directed graph, adding one or more pipeline stage boundaries to the graph, and repositioning the one or more pipeline stage boundaries.

9. The method as recited in claim 1, wherein the partitioning the program into pipeline stages introduces data structures for communication across the pipeline stages.

10. A system for pipelining a program with one or more tasks on a parallel computing platform with one or more processing units, comprising:
    a program annotation module configured to partition the program into pipeline stages, wherein each pipeline stage contains one or more tasks and to determine data to be communicated from stage i to stage (i+1) using:

$$\left\{\bigcup_{j=1}^{i} produced_j\right\} \cap \left\{\bigcup_{j=i+1}^{s} consumed_j\right\};$$

a scheduler configured to schedule one or more tasks in the pipeline stages onto the one or more processing units;
    a profiler configured to estimate execution times, using a processor, of the one or more tasks in the pipeline stages; and
    an optimizer configured to repeat the above steps until a specified termination criterion is reached.

11. The system as recited in claim 10, wherein the program is specified using annotations in the source code, with the annotations being employed to identify one or more tasks in the program.

12. The system as recited in claim 10, wherein the one or more tasks in the program have dependencies from other tasks.

13. The system as recited in claim 10, further comprising a parallel computing platform configured to execute a pipelined program to estimate the execution times of the one or more tasks in the pipeline stages, wherein at least one task in the program is profiled on at least one of the processing units, with a result of profiling the at least one task in the program being employed to estimate the execution times of the one or more tasks in the pipeline stages.

14. The system as recited in claim 10, wherein the specified termination criteria is reached when partitioning the program into pipeline stages results in a partition that is identical to a previously derived partition.

15. The system as recited in claim 10, wherein the specified termination criteria is reached when the above steps have been executed a specified number of times.

16. The system as recited in claim 10, wherein each of the one or more tasks in the program employs parallel computations which are exploited during task execution on the one or more processing units.

17. The system as recited in claim 10, wherein the partitioning the program into pipeline stages is performed by representing the program as a directed graph, adding one or more pipeline stage boundaries to the graph, and repositioning the one or more pipeline stage boundaries.

18. The system as recited in claim 10, wherein the partitioning the program into pipeline stages introduces data structures for communication across the pipeline stages.

19. A method for automatically generating a pipelined program, using a computer processor, on a parallel computing platform, comprising:

receiving an un-pipelined program;

constructing an intermediate representation with one or more tasks to represent the un-pipelined program;

determining data to be communicated from stage i to stage (i+1) using:

$$\left\{\bigcup_{j=1}^{i} produced_j\right\} \cap \left\{\bigcup_{j=i+1}^{s} consumed_j\right\};$$

partitioning the un-pipelined program into pipeline stages;

scheduling the one or more tasks to execute on the parallel computing platform; and generating a pipelined program for execution on the parallel computing platform.

* * * * *